United States Patent [19]

Potter

[11] Patent Number: 4,874,005

[45] Date of Patent: Oct. 17, 1989

[54] CURRENT TO PRESSURE TRANDUCER EMPLOYING MAGNETIC FLUID

[76] Inventor: Robert I. Potter, 11200 Canon Vista, San Jose, Calif. 95127

[21] Appl. No.: 281,125

[22] Filed: Dec. 7, 1988

[51] Int. Cl.⁴ .......................................... G05D 16/00
[52] U.S. Cl. ...................................... 137/85; 137/82; 251/129.08
[58] Field of Search ................ 137/82, 85; 251/129.08

[56] References Cited

U.S. PATENT DOCUMENTS 4,053,952 10/1977 Goldstein ...................... 417/412 X
4,579,137 4/1986 Brandt ........................ 251/129.08 X Primary Examiner—Alan Cohan
Attorney, Agent, or Firm—Nathan N. Kallman

[57] ABSTRACT

A current-to-pressure transducer that is insensitive to shock employs a magnetic fluid that deforms a flexible diaphragm in response to an electrical input current that is applied to a coil and magnetic circuit. The deformed diaphragm varies the air space between the diaphragm and a nozzle connected to the air line so that the pressure within the air line is effectively controlled.

10 Claims, 3 Drawing Sheets

CURRENT TO PRESSURE TRANDUCER EMPLOYING MAGNETIC FLUID

FIELD OF THE INVENTION

This invention relates to the regulation of air pressure in response to electrical signals and in particular to a transducer for converting an electrical current to a corresponding pressure in a system that uses compressed air.

BACKGROUND OF THE INVENTION

1. Description of the Prior Art

Compressed air is used in many systems for controlling machinery because compressed air is immune to electrical interference and is safe in explosive environments. Compressed air is generally used, for example, to control valves and other mechanical devices in industrial systems. When using compressed air in a system, sensors are generally provided that generate small electrical currents, in the range of 4 to 20 milliamperes, for example. These currents are used to establish a corresponding pressure of the compressed air and to provide a sufficient volume of pressurized air for accomplishing the desired mechanical task. In some systems, the conversion from electrical current to a corresponding pressure is accomplished by use of a current-to-pressure transducer that is capable of regulating the pressure of a small volume of air, wherein the volume of air is amplified by using standard pneumatic amplifiers. In the conventional current-to-pressure transducer, a nozzle is supplied that directs compressed air to the atmosphere at a rate determined by the proximity of a flapper valve to a nozzle orifice. The flapper valve is generally mounted on a rotating suspension and is rotated by magnetic forces that are generated by an electromagnet. The flapper is rotated toward the nozzle so that the air that escapes to the atmosphere is reduced. Such prior art devices are formed as delicate mechanical assemblies that require several adjustments during fabrication and are relatively expensive to produce.

It is highly desirable to employ a simple current-to-pressure transducer that lends itself to facile production at low cost without the need for individual mechanical adjustments.

SUMMARY OF THE INVENTION

An object of this invention is to provide a current-to-pressure transducer that regulates the air pressure within an air supply line so that the pressure differential between this line and ambient air pressure varies substantially linearly with an applied electrical current. Henceforth, the word "pressure" will be used to mean the pressure relative to the environment.

Another object of this invention is to provide a transducer that is relatively efficient and has uniform characteristics so that individual adjustments need not be made.

Another object is to provide a current-to-pressure transducer that can be mass produced at low cost.

A further object is to provide a current-to-pressure transducer that is immune to electrical interference and is safe in explosive environments.

In accordance with this invention, a current-to-pressure transducer incorporates a magnetic fluid that is in contact with a flexible membrane or diaphragm. The diaphragm responds to forces exerted on the magnetic fluid and moves towards a nozzle to narrow the space through which the air flowing from the nozzle is passed to the ambient environment. The diaphragm moves in accordance with an electrical input current. The current is applied to a coil wound around a magnetic circuit that moves the flexible membrane towards the nozzle by means of the magnetic fluid. Movement of the membrane towards the nozzle decreases the flow of air from the nozzle and increases the pressure of the air within the air supply line. In one embodiment pressure sensing means and electronic feedback are used to achieve the desired linearity between the pressure within the line supplying air to the nozzle and the electrical input current.

BRIEF DESCRIPTION OF THE DRAWINGS

The invention will be described in greater detail with reference to the drawing in which.

DESCRIPTION OF THE PREFERRED EMBODIMENT

Figure 1:
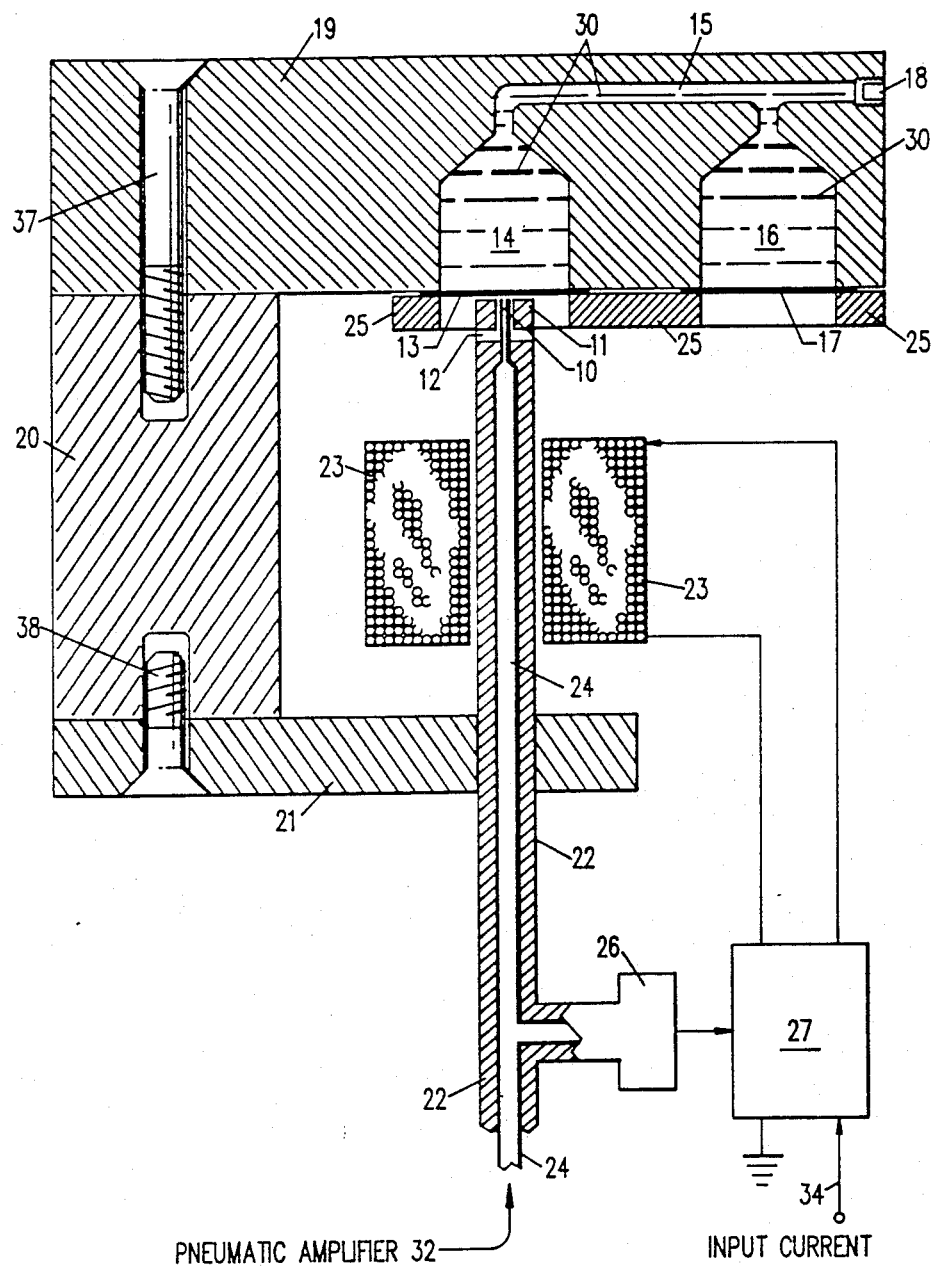
FIG. 1 is a side cross-sectional view of a current-to-pressure transducer, made in accordance with this invention.

With reference to FIG. 1, the current-to-pressure transducer of this invention receives compressed air from a pneumatic amplifier 32. The current-to-pressure transducer includes an air supply line 24 having a nozzle 10 at one end and is coupled at the other end to the pneumatic amplifier 32.

Figure 4:
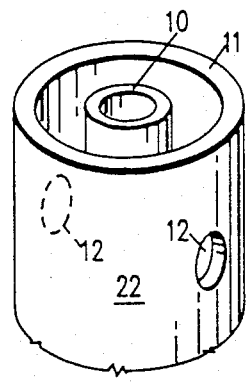
FIG. 4 is an enlarged isometric view, partly broken away, sowing the relationship of a pole piece 11 to the nozzle 10 and the nozzle air supply line 24, as used in the transducer of this invention.

A baseplate 19 made of magnetically soft material is joined to a magnetic member 20 by a screw 37 or other suitable means. A magnetic member 21 is attached to the member 20 by a screw 38 or other attachment means. A cylindrical magnetic member 22 is positioned in contact with and partly within an aperture of the magnetic member 21. As illustrated in FIG. 4, a pole piece 11 is provided at the upper end of the tubular member 22.

A coil 23 is wound around a portion of the magnetic member 22. Baseplate 19, magnetic members 20, 21 and 22, the gap between pole piece 11 and the magnetic fluid 30 in chamber 14 and the magnetic fluid 30 in chamber 14 form a magnetic circuit. When current is applied to the coil 23, the magnitude of the magnetic flux at the pole piece 11 is varied in accordance with the magnitude of the current signal.

The baseplate 19 is formed with two chambers 14 and 16 that are connected by a capillary tube 15. In keeping with this invention, a magnetic fluid 30 which may be a colloidal suspension of magnetic particles in a nonmagnetic carrier, such as Ferrofluid (a trademark of Ferrofluidics Corporation, Nashua, New Hampshire) is provided to chambers 14 and 16 and the capillary tube 15. The magnetic fluid 30 may also be any composite, noncolloidal material that is not capable of supporting shear forces and that exhibits a magnetic susceptibility. A plug 18 is provided to enable filling the capillary tube 15 and chambers 14 and 16 with magnetic fluid 30.

In accordance with this invention, flexible membranes or diaphragms 13 and 17 are located respectively at the lower open ends of the chambers 14 and 16 to seal the ends of the chambers and to contain the magnetic fluid 30 within the chambers. The flexible membranes 13 and 17 are retained by a nonmagnetic retainer element or ring 25 which abuts the diaphragms. The element 25 is fastened at its exposed surface to the baseplate 19 by screws or other suitable means In operation, the pneumatic amplifier 32 provides compressed air through the air supply line 24 to the nozzle 10. The air passes through the space between the diaphragm 13 and the surface of the nozzle 10. Escape holes 12 or other suitable means are provided in the upper portion of the magnetic member 22, as shown in FIG. 4 to prevent undesirable pressure buildup between the pole piece 11 and diaphragm 13. An air pressure sensor 26 senses the pressure of the compressed air that is passing through the air supply line 24 and generates a signal representative of the pressure value. The signal is provided to an electronic feedback circuit 27, which also receives the input current through lead 34. The input current and the signal representative of the pressure value are compared in the circuit 27 and a current representative of this comparison is provided to the coil 23. The electronic feedback circuit 27 adjusts the actual current to the coil 23 so that the pressure in the air line 24 is substantially linear with the input current. The input current during operation maintains the coil in an excited state and as a result the pole piece 11 distributes magnetic flux in the area adjacent to the diaphragm 13. The magnitude of the magnetic flux emanating from the pole piece 11 varies with variations in the current supplied to the coil 23. The magnetic fluid 30 in chamber 14 is attracted towards the pole piece 11 and the diaphragm 13 is deformed to an extent directly related to the magnitude of the current which is applied to the coil 23. The diaphragm 13 deforms and moves partially towards the pole piece 11 so that the space between the diaphragm 13 and the nozzle 10 decreases. As a result, the pressure of air within the air line 24 supplying air to the nozzle 10 is increased. During the deformation of the diaphragm 13 resulting from the magnetic fluid 30 being moved towards the pole piece 11, the volume of magnetic fluid that is displaced in chamber 14 associated with the displacement of diaphragm 13 is provided from chamber 16 to chamber 14. The diaphragm 17 moves inwardly to the chamber 16 in an equal and opposite direction to diaphragm 13.

Figure 2:
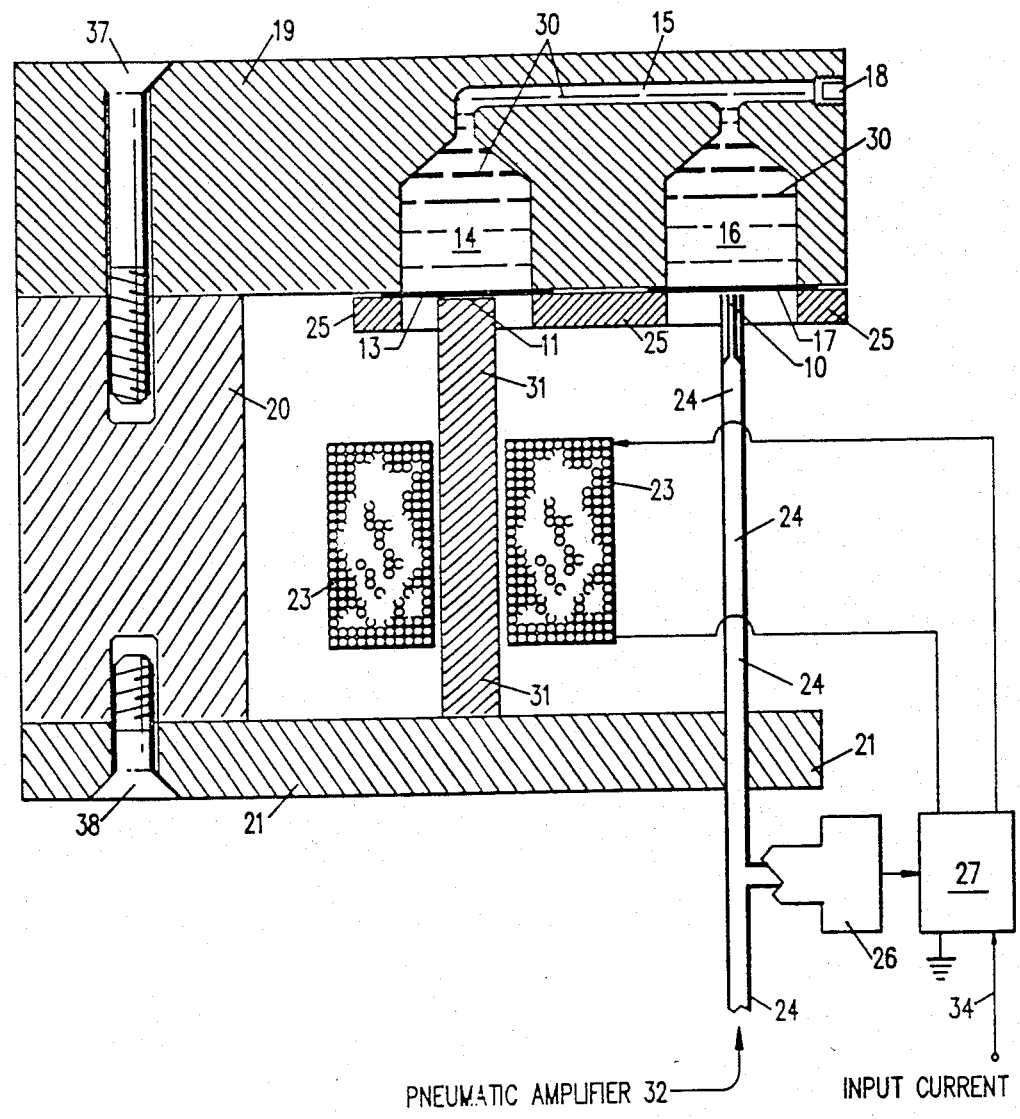
FIG. 2 is a side cross-sectional view of an alternative implementation of the current-to-pressure transducer of this invention.

With reference to FIG. 2, the air supply line 24 including the nozzle 10 is located under the chamber 16. The coil 23 and the associated magnetic members 20, 21, 31, baseplate 19 and pole piece 11 remain in association with the chamber 14 for coaction with the diaphragm 13. An increase in current to the coil 23 causes the diaphragm 13 to deform toward the pole piece 11 and the volume of magnetic fluid that is displaced from chamber 16 to chamber 14 causes the diaphragm 17 to move away from the nozzle 10. Consequently, the pressure of the air in line 24 is decreased. In this embodiment of FIG. 2, the air line 24 is made of nonmagnetic material such as aluminum, or alternatively is magnetically isolated from the magnetic circuit which includes the coil 23 and the magnetic member 22, inter alia.

A feature of this invention is the insensitivity to gravitational or acceleration forces. Because the magnetic fluid 30 is relatively incompressible, the diaphragms 13 and 17 move equally in opposite directions. In those embodiments in which the diaphragms are coplanar, the transducer is insensitive to forces that are applied perpendicularly to the plane of the diaphragms. The transducer is relatively insensitive to forces that are applied perpendicularly to the plane of the drawing and a line through the centers of the chambers, irrespective of whether the diaphragms are coplanar. Also the viscous damping that is associated with the transport of the fluid 30 through the capillary 15 causes the transducer to be insensitive to shock in any direction. The damping is enhanced as the viscosity of the magnetic fluid 30 is increased and the conductance of the capillary 15 is decreased. Damping also can be used to limit the high frequency response of the transducer.

Figure 3:
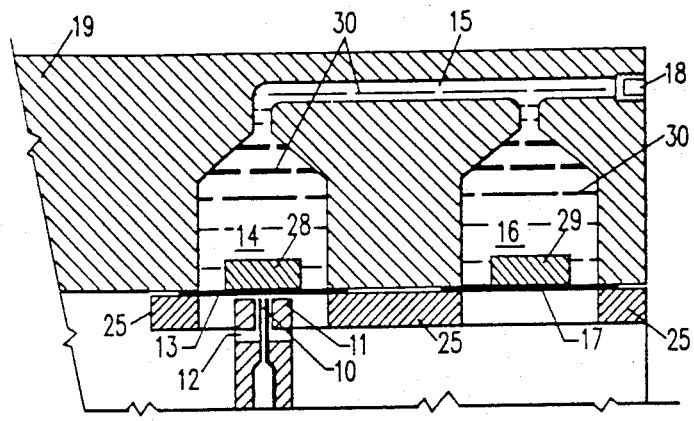
FIG. 3 is a cross-sectional view, partly broken away, of another implementation of the invention.

As illustrated in FIG. 3 in another implementation of the invention, a further increase in sensitivity is achieved by affixing an element 28 mad ®cf a solid, magnetically soft material, such as iron, to the center of the diaphragm 13. The element 28 is disposed within the magnetic fluid in chamber 14 and has a higher saturation magnetization than the magnetic fluid. The element 28 also can provide stiffness to the central portion of the diaphragm. To preserve shock insensitivity, an element 29 is located in the chamber 16 and is affixed to the diaphragm 17. The element 29 may be substantially identical to the element 28, or may be of a nonmagnetic material with suitable size and shape to achieve the desired insensitivity.

Figure 5:
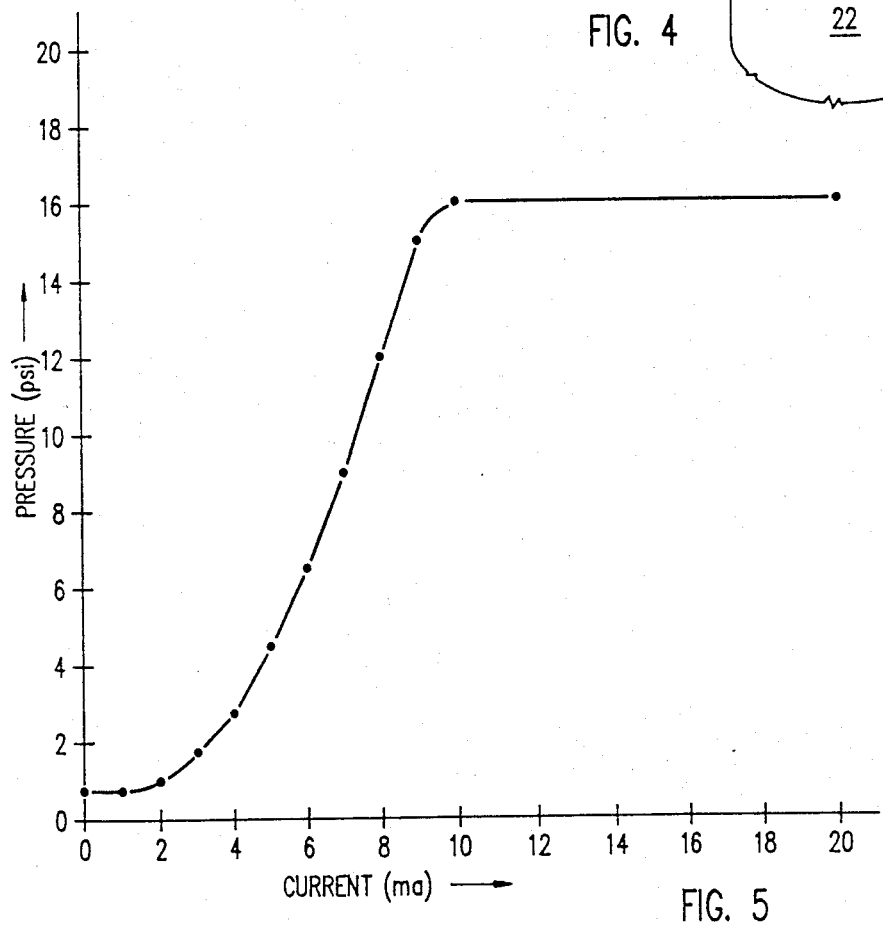
FIG. 5 is a representative curve plotting pressure against current without electronic feedback to aid in the explanation of the operation of the current-to-pressure transducer.

FIG. 5 is a curve representing the changes in pressure (psi) as a function of current (milliamps). In an actual implementation of the invention, a 450 Gauss, 400 cp Ferrofluid was used. The element 28 is a steel slug of ⅜-inch diameter and 3/16-inch long cemented to the diaphragm 13 with RTV silicone sealant. The air supply pressure is 18 psi. It should be understood that these parameters, materials and dimensions are exemplary and the invention is not limited thereby.

In an alternative approach the transducer comprises a single chamber and a single flexible diaphragm. In such case an air space is provided above the level of the magnetic fluid to allow displacement of the diaphragm.

In another approach, nozzle 10 is made of magnetic material and functions also as pole piece 11. In this approach, the outer coaxial member 11 and holes 12 shown in FIG. 4 are eliminated.

The novel current-to-pressure transducer disclosed herein employs a magnetic fluid to coact with flexible diaphragms disposed in close juxtaposition to a nozzle of an air line. The transducer lends itself to mass production and low cost, is efficient in operation, and does not require individual adjustments.

What is claimed is:
1. A current-to-pressure transducer comprising:
means for supplying a flow of air;
first and second chambers and a means connecting said chambers, each of said chambers having an open end;
magnetic fluid disposed within said chambers and said connection means;
first and second flexible diaphragms respectively positioned against said open ends for containing said fluid within said chambers; and
electromagnetic means energized by an input electrical current for coacting with said magnetic fluid to deform a selected one of said diaphragms thereby varying the air pressure in said supply means.

2. A current-to-pressure transducer as in claim 1, wherein said electromagnetic means is positioned for coacting with said magnetic fluid in one of said chambers to deform a selected one of said diaphragms, and said air supply means is positioned for coacting with the other one of said diaphragms.

3. A current-to-pressure transducer as in claim 1 wherein the diaphragms are coplanar.

4. A current-to-pressure transducer comprising:
a baseplate or housing made of magnetic material:
at least one chamber formed in said baseplate, said chamber having at least one open end;
at least one flexible membrane or diaphragm for sealing said open end;
a volume of magnetic fluid contained within said chamber;
air supply means disposed closely adjacent to said flexible membrane or diaphragm for supplying air;
electromagnetic means comprising a magnetic circuit and a coil including permanent magnet means for receiving an input current to provide a magnetic field closely adjacent to said flexible membrane or diaphragm for displacing said flexible membrane or diaphragm relative to said air supply means so that the pressure of said air in said air supply means is regulated in accordance with said input current, wherein the displacement of said flexible membrane or diaphragm is accomplished with the volume of said magnetic fluid conserved and maintained constant and wherein said displacement is not opposed by ambient pressure.

5. A current-to-pressure transducer as in claim 4, wherein said electromagnetic means comprises a magnetic tubular element and an said coil is wound about said element.

6. A current-to-pressure transducer as in claim 5, wherein said air supply means comprises a tube disposed coaxially within said magnetic tubular element, and a nozzle disposed at one end of said tube closely adjacent to said a flexible membrane or diaphragm.

7. A current-to-pressure transducer as in claim 4, including a magnetic piece positioned within said chamber adjacent to said membrane or diaphragm.

8. A current-to-pressure transducer as in claim 4, wherein an air space is provided within said magnetic fluid.

9. A current-to-pressure transducer as in claim 4, including a pressure sensing means, and an electronic feedback circuit for limiting the current to said electromagnetic means so that the pressure is substantially linearly related to the input current.

10. A current-to-pressure transducer as in claim 4 including means for maintaining said membrane or diaphragm in position at said open end of said chamber.

* * * * *